(12) United States Patent
Krijn et al.

(10) Patent No.: US 9,250,446 B2
(45) Date of Patent: Feb. 2, 2016

(54) AUTOSTEREOSCOPIC DISPLAY DEVICE (75) Inventors: Marcellinus Petrus Carolus Michael Krijn, Eindhoven (NL); Bart Kroon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 81 days.

(21) Appl. No.: 14/000,225

(22) PCT Filed: Feb. 13, 2012

(86) PCT No.: PCT/IB2012/050633
§ 371 (c)(1),
(2), (4) Date: Aug. 19, 2013

(87) PCT Pub. No.: WO2012/110934
PCT Pub. Date: Aug. 23, 2012

(65) Prior Publication Data
US 2014/0002897 A1    Jan. 2, 2014

(30) Foreign Application Priority Data

Feb. 18, 2011    (EP) .................................... 11154984

(51) Int. Cl.
*G02B 27/22* (2006.01)
*H04N 13/04* (2006.01)

(52) U.S. Cl.
CPC ........ *G02B 27/2214* (2013.01); *H04N 13/0404* (2013.01); *H04N 13/0415* (2013.01); *H04N 13/0422* (2013.01)

(58) Field of Classification Search
CPC ...... G02B 27/017; G02B 27/26; G02B 27/22; G02B 27/2214; G02B 27/2228; G02B 27/2257; G02B 27/2235; G02B 27/225; H04N 9/3197; H04N 9/3105; H04N 13/04; H04N 13/0404–13/0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; G03B 35/00–35/12; G03B 35/20; G03B 31/00; G03B 31/06
USPC ...................... 359/462–464, 466; 348/42–60; 353/7–9; 349/8–9, 15
See application file for complete search history.

(56) References Cited

U.S. PATENT DOCUMENTS

| 6,064,424 A | 5/2000 | van Berkel |
| 2006/0284972 A1 | 12/2006 | Aoki |
| 2008/0266318 A1* | 10/2008 | Peeters et al. ................. 345/603 |

(Continued)

FOREIGN PATENT DOCUMENTS

| WO | 2007031931 A2 | 3/2007 |
| WO | 2010070564 A1 | 6/2010 |

(Continued)

*Primary Examiner* — Thomas K Pham
*Assistant Examiner* — Sharrief Broome (57) ABSTRACT

The invention provides a autostereoscopic display device with a particular design of lenticular lens array (lens pitch and slant angle) to optimize the quality of the views provided to the user, when a multi-primary pixel layout is used, with at least four sub-pixels of at least three different colors. The slant angle and lens pitch is related to the pixel pitch (in the row and column directions) as well as the number of different color sub-pixels.

12 Claims, 10 Drawing Sheets

(56) References Cited

U.S. PATENT DOCUMENTS

2009/0116108 A1    5/2009    Levecq
2009/0190096 A1    7/2009    Chen
2010/0259697 A1   10/2010    Sakamoto

FOREIGN PATENT DOCUMENTS

WO             2011006551 A1     1/2011
WO    WO 2011006551 A1 *   1/2011   ......... H04N 13/0404

* cited by examiner

RGBW_4  RGBW_6  RGBW_8

FIG. 6

RGBY_4

AUTOSTEREOSCOPIC DISPLAY DEVICE

FIELD OF THE INVENTION

This invention relates to an autostereoscopic display device with a display panel having an array of display pixels and an arrangement for directing different views of an image displayed on the display panel to different physical locations in a field of view of the autostereoscopic display device.

BACKGROUND OF THE INVENTION

A known autostereoscopic display device is described in U.S. Pat. No. 6,064,424. Without going into detail, the known devices comprise a regular two dimensional display panel having a row and column array of display pixels each having red green and blue sub-pixels acting as an image forming means to produce a display. An array of elongate lenticular lenses extending parallel to one another and with its long lenticular lens axes slanted with regard to the pixel columns overlies the display pixel array and acts as a view forming means. Outputs from the display sub-pixels are projected through these lenticular lenses, which function to modify the directions of the outputs.

Each of the lenticular lenses overlies a respective group of two or more display sub-pixels such that the output of the sub-pixels of a group is projected into mutually different directions therewith providing so called views in different directions.

The output of all lenticular lenses provide a sub-image (of the image displayed on the display panel) per view such that when a viewer receives different views in his/her left and right eyes, respectively he/she observes a stereoscopic image. The sub-images are thus parallactic.

In the disclosed device more than two views can be provided with the sub-images being such that as a user's head is moved from left to right across these views within a field of view of the autostereoscopic display, a series of successive, different, stereoscopic views are observed creating, for example, a look-around impression.

In the known display the sub-images have a lower resolution than the native resolution of the display panel as determined by the pixel array as the sub-pixels of a group of sub-pixels end up in different views. To even loss of resolution in a view between row and column direction and also reduce brightness intensity variation across views the lenticular lenses are slanted with respect to the pixel columns. The use of slanted lenses is thus recognized as an important feature to produce different views with good pixel structure and near constant brightness.

Traditionally, display panels are based on a matrix of pixels that are square in shape. In order to generate images in color, the pixels are divided into sub-pixels. Traditionally, each pixel is divided into 3 sub-pixels, transmitting or emitting red (R), green (G) and blue (B) light, respectively. Sub-pixels of equal color are typically arranged in columns.

Recently, display manufacturers have started looking into alternative pixel layouts with the aim, given the same number of sub-pixels, to achieve:
- a higher perceived resolution and/or
- a larger color gamut, and/or
- a higher brightness (or reduced power consumption).

Several of the alternative pixel layouts have made it to the market. However, these changes in the pixel design require adaptation to the lenticular design, for optimal performance in terms of the pixel structure, evening of resolution loss and/or brightness properties (color density) in the views when using these alternative display panel pixel layouts.

SUMMARY OF THE INVENTION

It is an object of the invention to provide an autostereoscopic display device that takes account of one or more of the above described requirements for adaptation of lenticular lens design with regard to pixel layout.

The object is achieved with an autostereoscopic display device according to the invention. The invention is defined by the independent claims. The dependent claims provide advantageous embodiments.

According to the invention, there is provided an autostereoscopic display device as defined in claim 1.

The term field of view of the display indicates a region in front of the display where autostereoscopic viewing is enabled, i.e. a region where a viewer can observe a stereoscopic image. It need not be the complete region in front of the display where such viewing is enabled.

The terms 'general column direction' and 'general row direction' each indicate a direction along a straight line connecting the centers of area (points) of neighboring pixels (since the pixels form a regular grid/array of color pixels). Thus, the color pixel boundaries and/or sub-pixel boundaries need not lie on straight lines as these may be stepped.

The combination of lenticular lens pitch and lenticular lens slant angle of the display according to the invention has been found to provide an optimum color pixel layout in the views created by the lenticular lens array, in terms of spacing of sub-pixels, and uniformity of color density within a view.

In a first embodiment, $\beta_x = \beta_y = 0$, $n_1/n_2$ is non integer, and $$\frac{a}{b} = \frac{2}{q \cdot m}$$

wherein q is the number of different sub-pixels per pixel, and m is a positive integer number. In this embodiment the pixels are arranged in a regular grid parallel to the sides and top and bottom of the display device, thus, in this embodiment the display device as vertical columns and horizontal rows of pixels. Vertical rows and columns may have advantages for an autostereoscopic display of which the view creating function of the lenticular array can be removed or switched off to enable normal two-dimensional images to be displayed.

Preferably in the first embodiment $n_2 = q$, which means the lens width is a multiple of the fraction $1/q$ times the pixel width in the row direction, where q is the number of different color sub-pixels.

Preferably q=4 such that $$\tan(\theta) = \frac{1}{2m} \frac{p_x}{p_y},$$

and $$P_L = \frac{n}{4} \cdot p_x$$

with m and n being positive integer numbers.

This arrangement is suitable for RGBW (Red, Green, Blue, White) and RGBY (Red, Green, Blue, Yellow) pixels as well as other combinations of four color sub-pixels (sometimes referred to as primaries).

Preferably, n=4k+1 where k is a positive integer. This means the lens position with respect to the pixels repeats only every 4 lenses, providing a number of fractional views dependent on the number of different color sub-pixels.

In one example, $p_x/p_y=1$ and m=1 and n=5.

This provides a solution for square pixels, and gives a lens slant of ½.

In another example:

$p_x/p_y=⅔$ and m=1 and n=9.

This provides a solution for pixels that are 50% taller than wide, and gives a lens slant of ⅓.

In these two examples, each pixel can comprise four columns of sub-pixels and two rows of sub-pixels with different colors in each column, wherein the combined width of two columns is equal to the combined width of the other two columns.

The pixel can comprise an RGBW pixel, and the pixel column widths can all be the same.

However, in another example, each pixel can comprise an RGBY pixel having four columns of sub-pixels, and $p_x/p_y=1$ and m=3 and n=4 k+2 where k is a positive integer. This defines square RGBY pixels, and a lens slant of ⅙. If n=10, there are 2.5 pixels under each lens.

The red and blue sub-pixels can have the same width and the green and yellow sub-pixels can have the same width. The yellow and green sub-pixels can be narrower than the red and blue sub-pixels.

Preferably the rows of pixels are parallel to a top edge of the display and the columns of pixels are parallel to a side edge of the display.

In addition to examples with horizontal rows and vertical columns, the invention provides a general solution for the case where the rows and columns of pixels may be slanted with respect to the horizontal and vertical.

BRIEF DESCRIPTION OF THE FIGURES

Embodiments of the invention will now be described, purely by way of example, with reference to the accompanying drawings, in which.

DETAILED DESCRIPTION OF EMBODIMENTS

The invention provides a lenticular autostereoscopic display device with a particular design of the lenticular array (lens pitch and slant angle) to optimize the quality of the views provided to the user, when a pixel layout is used, with color pixels having at least four sub-pixels of at least three mutually different colors. The slant angle and lens pitch are related to the pixel pitch (in the row and column directions) as well as to the number of different color sub-pixels.

Before describing the invention in detail, the configuration of a known autostereoscopic display will first be described with reference to FIGS. 1 to 3.

Figure 1:
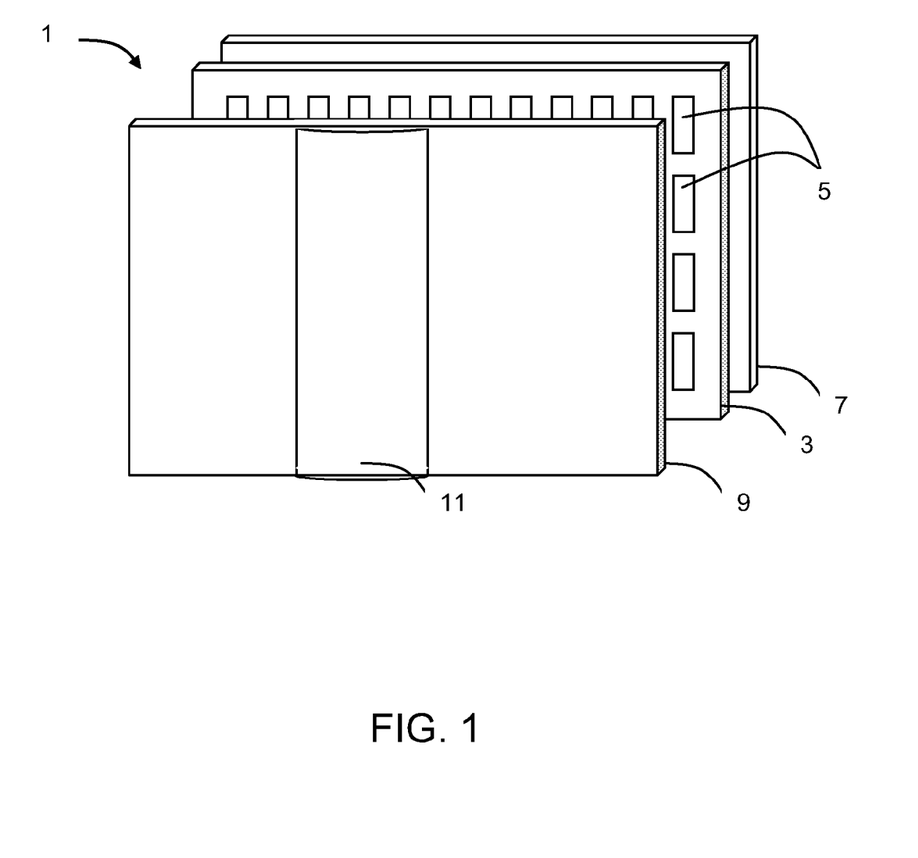
FIG. 1 is a schematic perspective view of a known autostereoscopic display device.
Figure 2:
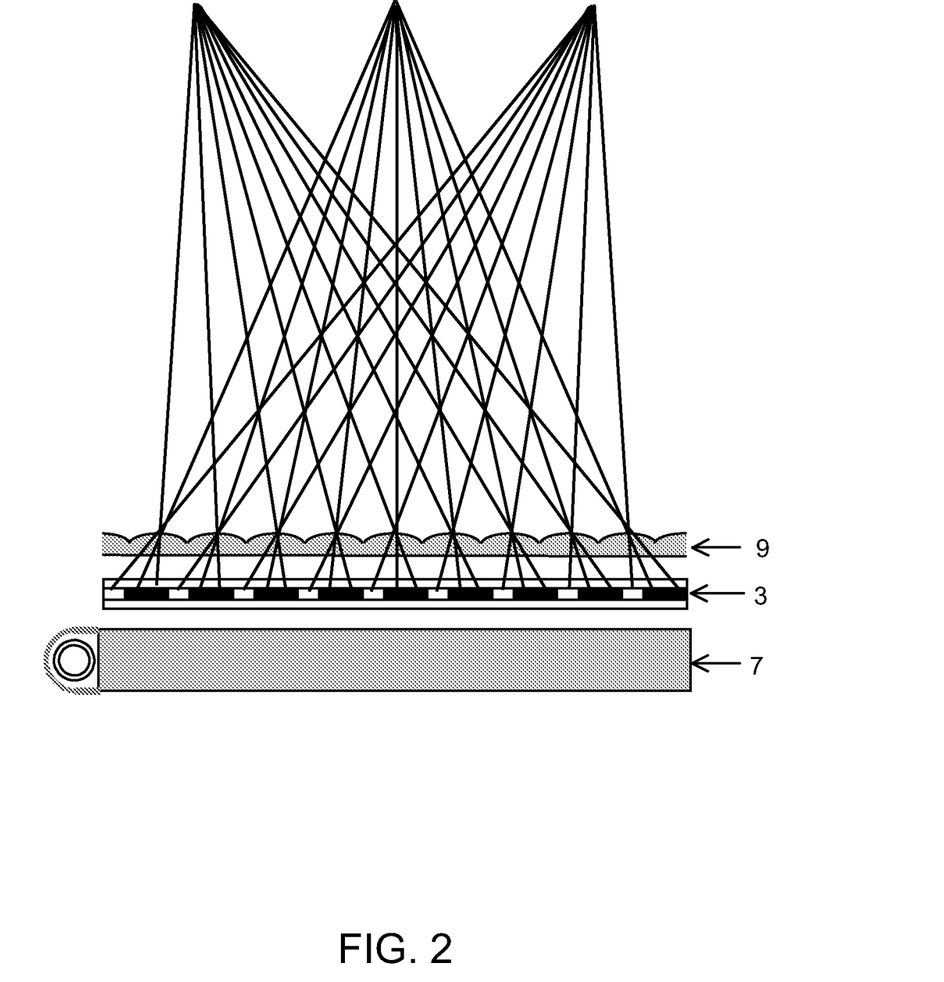
FIG. 2 is a schematic cross sectional view of the display device shown in FIG. 1.
Figure 3:
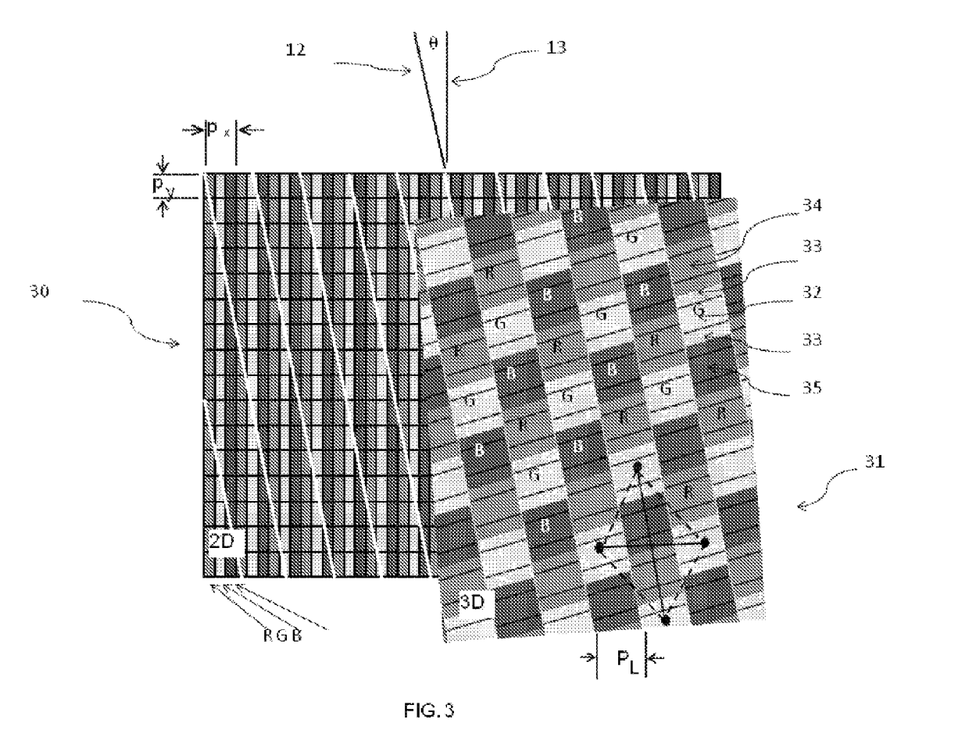
FIG. 3 shows how the known conventional RGB pixel is projected by the lenticular arrangement in a known display.

The known multi-view autostereoscopic display device 1 in FIGS. 1, 2 and 3 comprises a display panel 3, which in this case is an active matrix liquid crystal display (LCD), which acts as an image forming means.

The display panel 3 has an array of pixels arranged in orthogonal rows and columns. Each of the pixels is divided in three sub-pixels 5, one green (G), one blue (B) and one red (R) such that columns of R, G and B sub-color pixels exist across the display panel 3. This type of RGB layout is entirely conventional and is the same as that indicated with RGB_3 of FIG. 5. It is also observed in FIG. 3 in the display panel 3.

The structure of the LCD panel 3 is entirely conventional. Without detail, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each sub-pixel comprises opposing electrodes on the substrates, with the intervening liquid crystal material there between. The shape and layout of the sub-pixels 5 are determined by the shape and layout of the electrodes and a black matrix arrangement provided on the front of the panel 3. The sub-pixels 5 are regularly spaced from one another by gaps.

Each sub-pixel 5 is associated with a switching element, such as a thin film transistor (TFT) or thin film diode (TFD). The pixels are operated to produce the display by providing addressing signals to the switching elements, and suitable addressing schemes will be known to those skilled in the art.

The display panel 3 is illuminated by a light source 7 comprising, in this case, a planar backlight 7 extending over the area of the display pixel array. Light from the light source 8 is directed through the display panel 3, with the individual sub-pixels 5 being driven to modulate the light and produce the display.

The display device 1 also comprises a lenticular lens sheet/array 9, arranged over the display side of the display panel 3, which performs a view forming function. The lenticular lens sheet/array 9 comprises a row of lenticular lenses 11 extending parallel to one another, of which only one is shown with exaggerated dimensions. The lenticular lenses each have an imaginary long axis 12 along which there is no lens surface curvature. These long axes of the different lenticular lenses are also parallel. The lenticular lenses 11 act as view forming elements to perform the view forming function.

The lenticular lenses 11 are in the form of convex cylindrical elements, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular lens 11 overlies a small group of sub-pixels 5 in each row. The lenticular element 11 projects each display pixel 5 of a group in a different direction, so as to form the several different views. As the user's head moves from left to right, his/her eyes will receive different ones of the several views, in turn.

FIG. 2 shows the principle of operation of a lenticular type imaging arrangement as described above and shows the backlight 7, display panel 3 and the lenticular lens sheet 9. The arrangement of FIG. 2 provides three views I, II and III each projected in different directions within a field of view of the display device 1. Each sub-pixel of the display panel 3 is driven with information for one specific view.

For more details on the operation and design of the device of FIG. 1 the reader is referred to U.S. Pat. No. 6,064,424.

In systems using a lenticular lens array over a group of pixels to direct them into different views, native display panel pixel resolution is traded for depth; the more views, the higher the loss in resolution per view as every view requires different sub-pixels. When the lenticular lenses have their long axis parallel to the pixel columns as in FIG. 1, this resolution loss per view will be exclusively in the horizontal direction, i.e. along the (sub)-color pixel row direction. To bring the horizontal and vertical resolution loss within a sub-image of a view closer together and/or enable improved brightness uniformity within a view, the lenticular lenses are slanted at an acute angle relative to the columns of (sub)-pixels.

Slanting of the lenticular lenses is illustrated in FIG. 3, which shows the native sub-pixel layout 30 of the 2D display panel (reference 3 in FIG. 1) having columns of R, G and B that alternate in the row direction, as well as, on the same scale, the sub-pixel layout 31 in a particular view obtained after imaging or projection by the lenticular lenses in front of the display panel. The lenticular lens long axis 12 makes a slant angle θ with the pixel column direction 13 chosen such that $\tan(\theta)=\frac{1}{6}$ and a lenticular lens pitch ($P_L$) measured along the row direction 32 for which $P_L=1.5\ p_x$, where $p_x$ is the pixel pitch on the display panel in the row direction. This results in 9 views provided by the display device for one of which the (sub)-pixel layout 31 is shown. In this case, the horizontal and vertical color pixel pitches in the display panel 3 are equal, i.e. $p_x=p_y$. This however need not be the case for other embodiments of the invention.

The sub-image in the view 31 shown, has repeating patterns of R, G or B sub-pixels The colors of a few sub-pixels (R, G and B) are indicated so that all colors in the pattern can be understood. In the view, each color pattern (The pattern of Red, Green or Blue) is output as a diamond shaped grid of sub-pixels which are interleaved with each other. The diamond for the green pattern is indicated with the solid and dashed lines. It can be seen that each single color sub-pixel of a (3D) view is made up of a whole single color sub-pixel part 32 (G), 33 (R) or 34 (B) and half of a sub-pixel part 33 (e.g. between 32 G and 33 R, or between 32 G and 35 B). Hence every sub-pixel of a view has a certain amount of cross talk of neighboring views mixed in.

The whole and half parts of subpixels together make up the 3D view sub-pixel with an area that is nine times that of a 2D display panel sub-pixel area as there are nine views in total.

In the 3D view, the sub-pixels and the grid they define are regular to the extent that sub-pixel dimensions are almost square and no dominating colored slanted columns of such sub-pixels are formed, i.e. all sub-pixels are evenly distributed over the area.

As stated hereinbefore, display manufacturers started looking into alternative pixel layouts that use more than 3 sub-pixels of which having at least three have different (primary) colors. Pixel layouts using more than 3 colors will be termed "multi-colored" pixel layouts. Several such multi-colored layouts have reached the market and are expected to become mainstream for regular two dimensional display devices. These pixel layouts all may have advantages in terms of perceived image resolution and/or brightness for 2D images.

The invention now is concerned with the choice of the slant angle of the lenticular as well as its pitch such that a number of requirements are fulfilled as much as possible:

(i) A favorable distribution of pixels should be obtained for each 3D view. In each of the 3D views the sub-pixels of each color should be distributed in a pattern that is regular and having a resolution that is similar for the horizontal and vertical direction. As shown in FIG. 3, the horizontal distance between neighboring green pixels (labelled A in FIG. 3) should be comparable to the vertical distance between neighboring green pixels (labelled B). This should hold for the other colors as well.

(ii) The surface area occupied by sub-pixels of the same colors should be equal for each 3D view.

(iii) Optionally absence of moiré.

The combination of a lenticular in front of a display panel is very susceptible to the occurrence of moiré ('banding'). This effect is caused by the combination of the periodicity of the pixel layout of the display panel and the periodicity of the lenticular. It is worsened by the fact that the sub-pixels of the display panel are surrounded by a black matrix. By means of slanting the lenticular lenses and by choosing the lenticular lenses to have a pitch that is not equal to an integer times the pitch of a sub-pixel, this moiré effect can be minimized.

FIGS. 4 to 7 show several ones of such alternative pixel layouts. In each of the Figures, the sub-pixel colors for at least one pixel are identified with letter labels ("R", "G", "B" etc.). The pixels are in repeating patterns. Where whole columns of pixels have the same color, these are identified from above the columns. The colors of only enough pixels have been shown for the repeating pattern to be identified. In all Figs. $p_x$ denotes the pitch of a pixel in the row direction and $p_y$ denotes the pitch of a pixel in the column direction.

Figure 4:
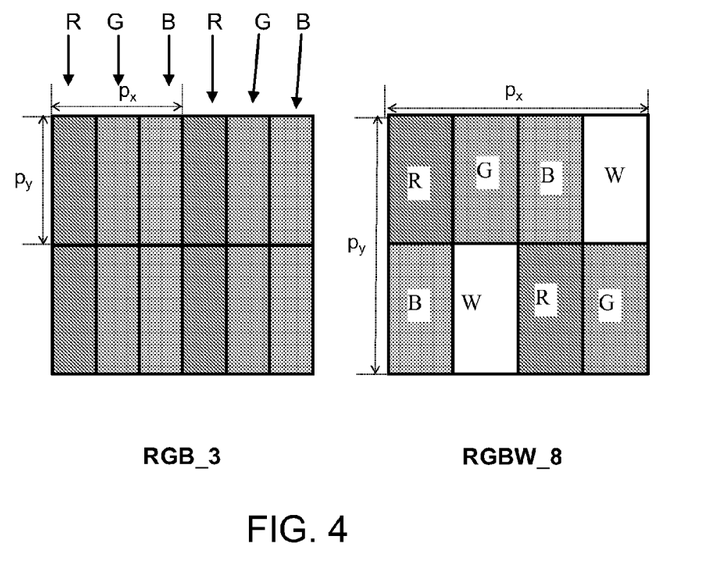
FIG. 4 shows the known RGB pixel layout and a known RGBW pixel for a display to which the invention can be applied.

The left part of FIG. 4 shows a conventional pixel layout of a 2×2 matrix of RGB pixels like the one described in relation to FIGS. 1 to 3. Each color pixel has three sub-pixels, hence the subscript "3" in RGB_3 (the same notation is used for all pixel layouts).

The right part of FIG. 4 shows a multi-colored pixel layout RGBW_8 pixel arrangement having 4 colors and 8 sub-pixels per pixel. In addition to RGB (Red, Green, Blue), also white (W) sub-pixels are provided. Comparing the layouts of RGB_3 and RGBW_8 (occupying the same surface area), the perceived resolution of both layouts is similar whereas the RGBW_8 layout results in a higher brightness (at least for LC panels): note that green and white are most important for generating a bright image, since the human eye is more sensitive to green and white light than it is to red and blue light.

Figure 5:
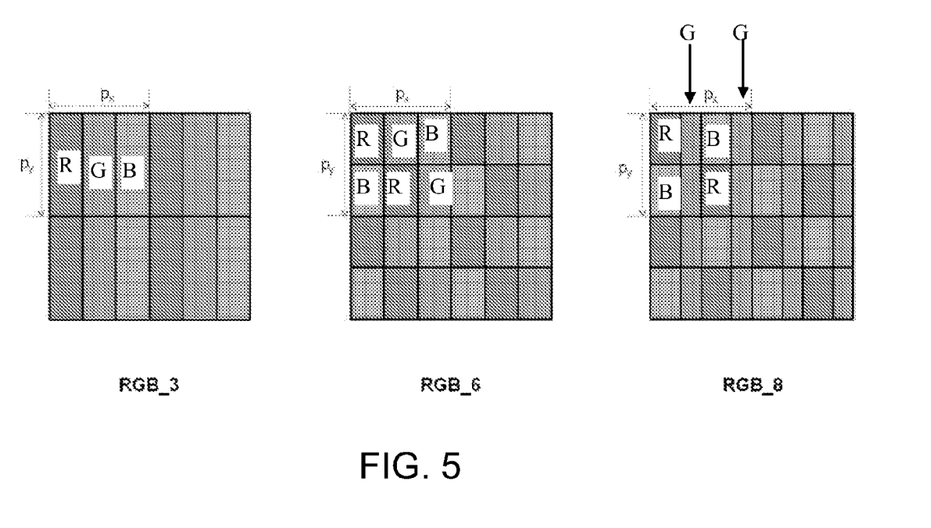
FIG. 5 shows other known RGB pixel layouts.

FIG. 5 shows several alternative RGB pixel layouts with more than three sub-color pixels per color pixel. The left image of FIG. 5 again is the conventional RGB_3 pixel layout. The RGB_6 layout in the middle essentially spatially inverts two pairs of RGB pixels. The RGB_8 layout on the right has made it to the market for 2D displays by Samsung. In the RGB_8 layout, the green sub-pixels are half as wide as the R and B sub-pixels. The green sub-pixels are in columns, whereas the R and B sub-pixels alternate along the column direction.

Figure 6:
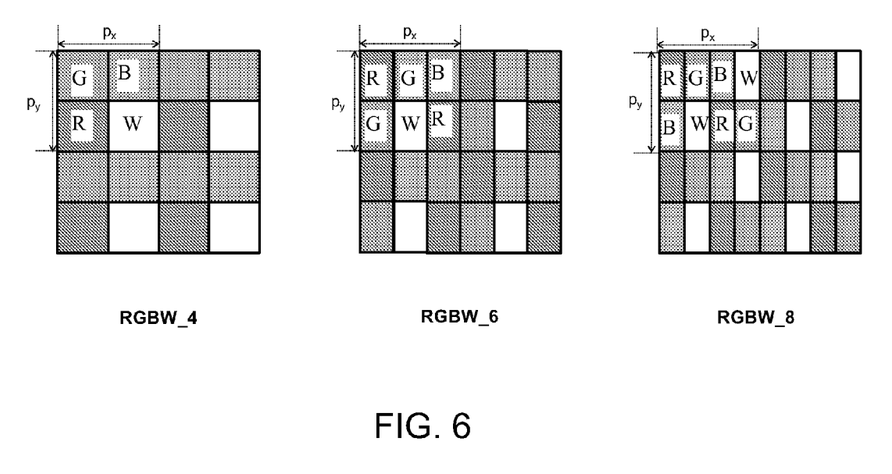
FIG. 6 shows three possible RGBW pixel layouts (including that of FIG. 4) for a display to which the invention can be applied.
Figure 7:
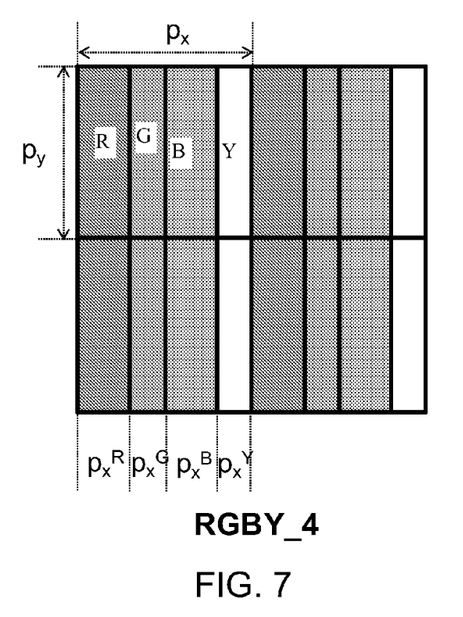
FIG. 7 shows an RGBY pixel layout for a display to which the invention can be applied.

In FIG. 6 and FIG. 7, the most promising pixel layouts based on 4-color sub-pixels are shown.

FIG. 6 shows three RGBW pixel layouts, whereas FIG. 7 shows an RGBY (Y=Yellow) pixel layout, which has been used by Sharp.

In FIG. 6 the different proportions of different primary colors (and white) in the different pixel layouts give different brightness characteristics as well as different output color gamut.

In FIG. 7, the red and blue sub-pixels are twice as wide as the green and yellow sub-pixels in the row direction ($p_x^R = p_x^B = 2\,p_x^G = 2\,p_x^Y$). When compared to the RGB layouts, this layout results in a larger color gamut.

The present invention is thus directed to the problem of designing a lenticular for display panels that make optimum use of such multi-colored pixel layouts, and in a way that preserves the benefits of having more than 3 colors in the 3D display panel.

The invention has been conceived based on an analysis of ray tracing simulations, to calculate and analyze the pixel layout of a view given the pixel layout of the 2D display panel and given the slant angle θ and pitch $P_L$ of the lenticular lenses.

Solutions for the various pixel layouts above are found in order to fulfill the three requirements listed above. The parameters varied are the lenticular slant angle θ and its pitch $P_L$.

Figure 8:
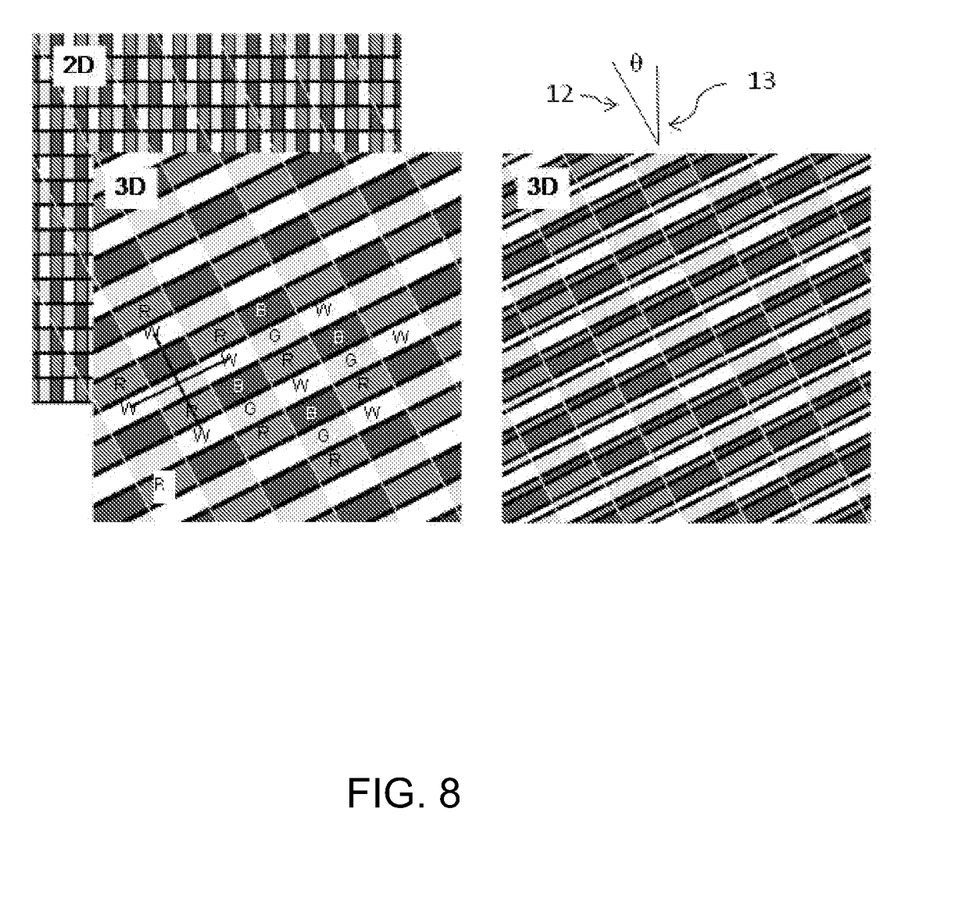
FIG. 8 shows a first display arrangement of the invention applied to an RGBW pixel with square pixels.

FIG. 8 shows a first embodiment according to the invention, in respect of the RGBW_8 pixel layout shown in FIG. 6.

This solution has the parameters:

$$\text{slant} = \tan(\theta) = \tfrac{1}{2},$$

$$P_L = \tfrac{5}{4} p_x,$$

$$p_y = p_x.$$

The results shown are for two different 3D views (these are observed at different viewing angles). The 2D panel pixel column direction 12 and long lenticular axis direction 13 and the slant angel theta that they define are indicated in the FIG. 8. The left example viewing angle has a repeating pattern of W,B,G,R sub-pixels in the slanted columns of the lenticulars. The adjacent columns are staggered, so that diamond shaped grids of sub-pixels are again defined (with respect to the lenticular axis). The axes of a diamond of white sub-pixels are shown in the FIG. 8.

The right example viewing angle results in the sub-pixels as they were in the left view to become split in mutually unequal areas where the parts are shifted over one lens width in the direction perpendicular to the long lens axis 12. Each 'column' of 3D view sub-pixels (in the direction of the long lenticular axis 12) has a repeating pattern (from top to bottom) which involves eight sub-pixels, in the sequence narrow green portion, wide white portion, narrow red portion, wide blue portion, narrow white portion, wide green portion, wide blue portion, wide red portion. Thus, each column has wide and narrow portions of the four colors in a sequence. Each portion (for example all the wide blue portions) is in the same diamond grid, so that the three objectives above are still met.

Figure 9:
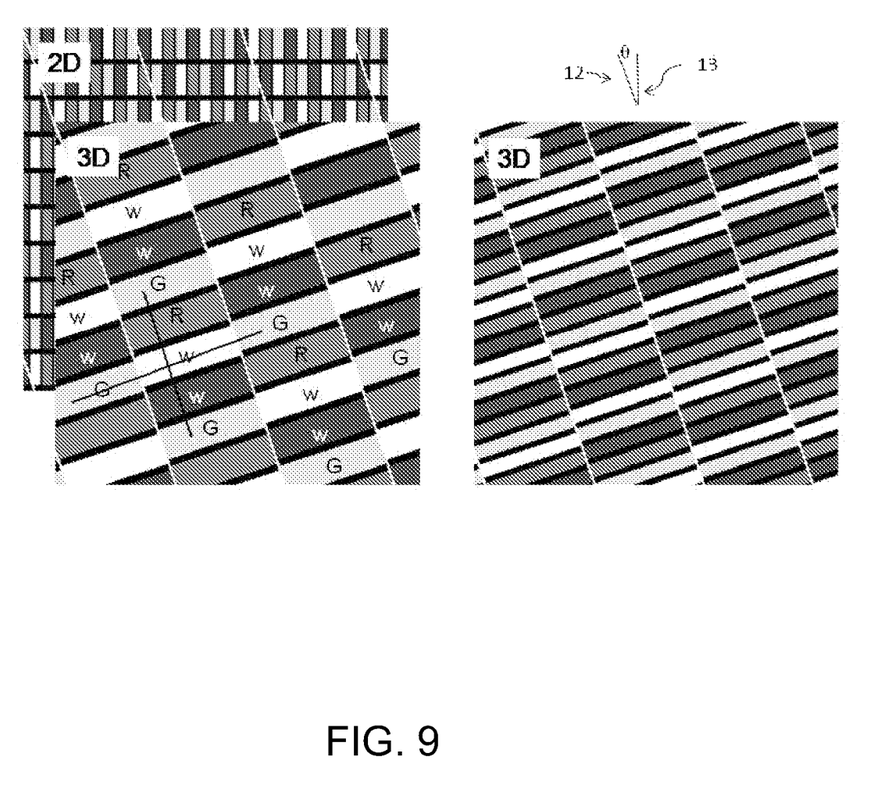
FIG. 9 shows a second display arrangement of the invention applied to an RGBW pixel with tall pixels.

FIG. 9 shows a second embodiment according to the invention, in respect of the same RGBW_8 pixel layout as in FIG. 8, but with taller pixels.

This solution has the parameters:

$$\text{slant} = \tan(\theta) = \tfrac{1}{3},$$

$$P_L = \tfrac{9}{4} p_x,$$

$$p_y = \tfrac{3}{2} p_x.$$

The results are again for two different Views as observed under different viewing angles. The 2D panel pixel column direction 12 and long lenticular axis direction 13 and the slant angel theta that they define are indicated in the FIG. 9.

The left example viewing angle again has a repeating pattern of W,B,G,R sub-pixels in the slanted columns of the lenticulars. The adjacent columns are staggered, so that diamond shaped grids of sub-pixels are again defined (with respect to the lenticular axis). The axes of a diamond of white sub-pixels are shown in the FIG. 9.

The right example viewing angle again results in the sub-pixels being split. Each 'column' (in the direction of the long lenticular axis 12) has a repeating pattern (from top to bottom) which involves eight sub-pixels, in the sequence green, blue, red, green, white, red, blue, white. Each set of corresponding portions are again in the same diamond grid, so that the three objectives above are still met.

Figure 10:
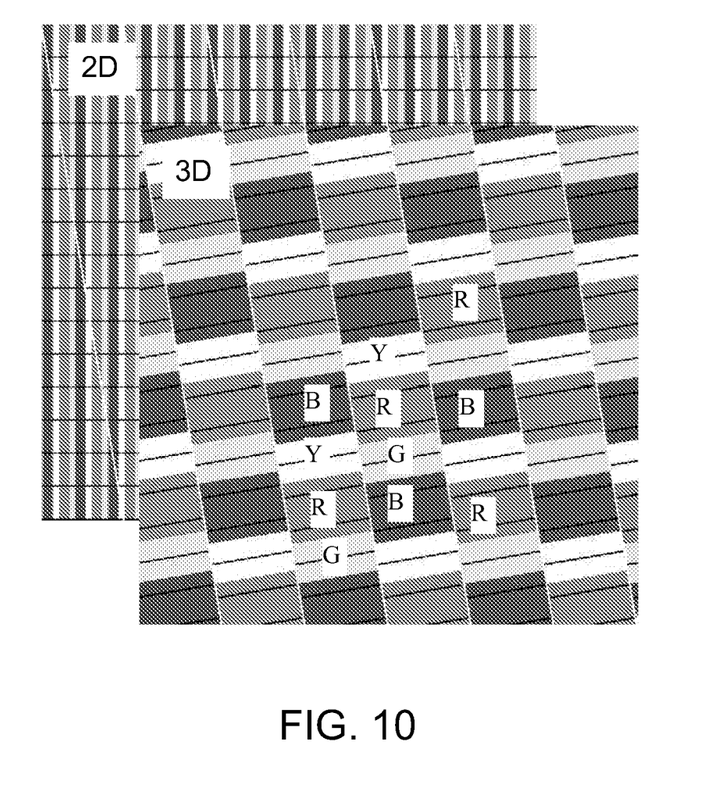
FIG. 10 shows a third display arrangement of the invention applied to an RGBY pixel with square pixels.

FIG. 10 shows a third embodiment of the invention, based on the RGBY_4 pixel layout of FIG. 7.

The solution has parameters:

$$\text{slant} = \tan(\theta) = \tfrac{1}{6},$$

$$P_L = \tfrac{5}{2} p_x,$$

$$P_y = P_x.$$

In this case, 3D views taken at different viewing angles look very similar hence only one view is shown.

The view has a repeating pattern of B, Y, R, G sub-pixels in the slanted columns of the lenticulars, again staggered so that diamond shaped grids of sub-pixels are defined (with respect to the lenticular axis).

The results for pixel layouts based on 4 colors, and with rectangular pixel grids, with rows and columns parallel to the display top and bottom and sides, can be summarized as follows:

Favorable lenticular designs are those designs for which the lenticular slant angle obeys the following relation:

$$\tan(\theta) = \frac{1}{2m}\frac{p_x}{p_y},$$

with m being a positive integer number.

The lenticular pitch should obey:

$$P_L = \frac{n}{4} \cdot p_x,$$

with n being a positive integer number.

This approach can be generalized to pixel layouts with more than 4 primary colors. Let q be the number of primaries. Then, favorable lenticular designs are those that obey:

$$\tan(\theta) = \frac{2}{q \cdot m}\frac{p_x}{p_y},$$

and $$P_L = \frac{n}{q} \cdot p_x,$$

with n being a positive integer number. More general, allowing for so-called fractional views, is to let $P_L$ obey the relation:

$$P_L = \frac{n_1}{n_2} \cdot p_x,$$

with $n_1$ and $n_2$ being positive integer numbers.

Figure 11:
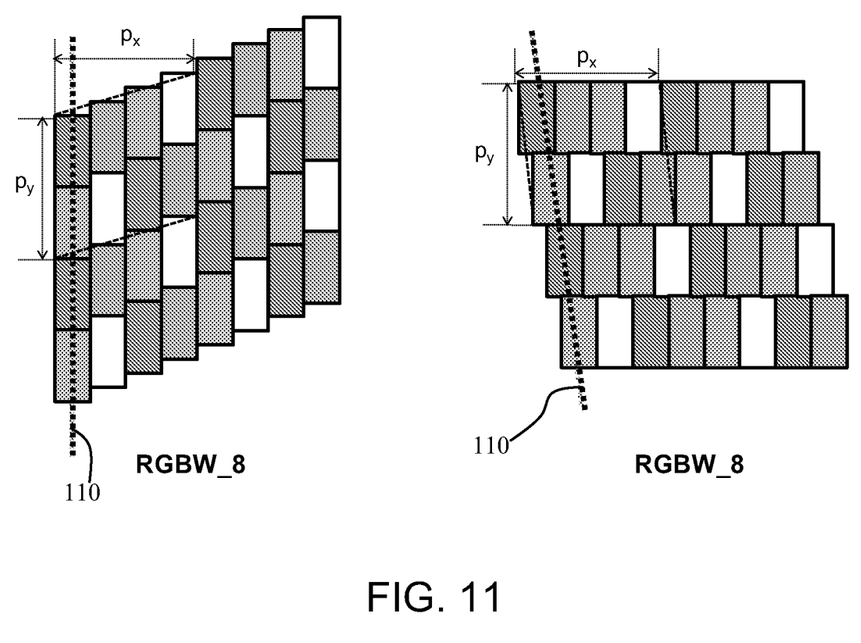
FIG. 11 shows a further alternative pixel layout to which the invention can be applied.

For the results of this analysis to remain valid, the display panel pixels do not necessarily have to be arranged on a rectangular grid. The unit cell of such a grid can also be trapezoid-shaped. Some examples are shown in FIG. 11. The sub-pixels themselves also do not necessarily need to have a rectangular shape.

The results above remain valid provided that the slant angle of the lenticular is now defined with respect to the average direction of the columns of pixels (dotted lines 110 in FIG. 11).

The colors in the pixel layouts shown in FIGS. 5 to 7 may be interchanged: especially blue (B) may be interchanged with red (R).

In the examples above, the sub-pixels have the same areas. However, this is not necessarily the case.

Figure 12:
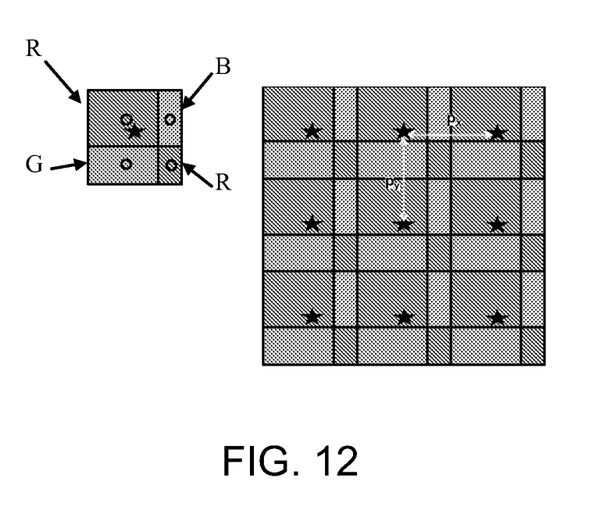
FIG. 12 shows a further alternative pixel layout to which the invention can be applied.

FIG. 12 shows another pixel layout. The image to the left is the smallest unit cell of four sub-pixels and shows the colors. The pixel layout comprises a repeating pattern of these basic units. The pixel contains 4 sub-pixels, not all of them emitting a different primary color. The open circles represent the centre of gravity of each of the sub-pixels. In this example, these centers of gravity lie on a rectangular grid. The stars in FIG. 12 denote the centre of gravity of a pixel as a whole. In this example, the centers of gravity of the pixels also lie on a rectangular grid.

Figure 13:
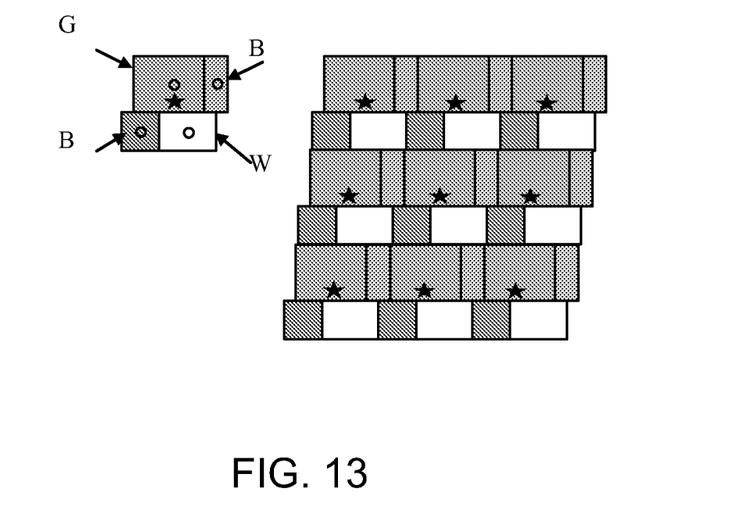
FIG. 13 shows how the slant angle can be calculated for a generalized pixel design.

FIG. 13 shows another pixel layout. In this case, each of the 4 different sub-pixels emit a different primary color while the centers of gravity of these sub-pixels do not lie on a rectangular grid. Furthermore, each of the sub-pixels constituting a pixel has a different size. The centers of gravity of the pixels on the other hand lie on a sheared (i.e. skewed) rectangular grid.

Figure 14:
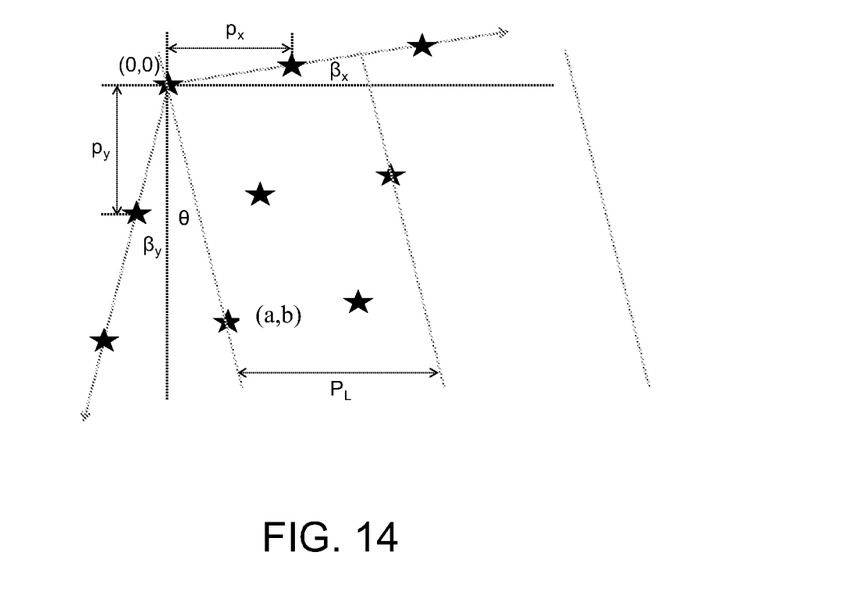
FIG. 14 represents the most general case of pixel layouts for the centers of gravity of the pixels.

FIG. 14 represents the most general case for the centers of gravity of the pixels; they lie on a rectangular grid that is skewed in both the x-direction and y-direction. The coordinate of the centre of gravity of a certain pixel labelled by (a,b) is:

$$\begin{pmatrix} x_a \\ y_b \end{pmatrix} = ap_x \begin{pmatrix} 1 \\ \tan(\beta_x) \end{pmatrix} + bp_y \begin{pmatrix} \tan(\beta_y) \\ 1 \end{pmatrix}$$

Here, a and b are integers. Different combinations of values of a and b relate to different pixel centers.

It has been found that the slant angles θ for the lenticular (defined relative to the vertical direction) that result in an optimum 3D image quality should obey the relation:

$$\tan(\theta) = \frac{x_a}{y_b}$$

This gives:

$$\tan(\theta) = \frac{ap_x + bp_y \tan(\beta_y)}{bp_y + ap_x \tan(\beta_x)}$$

This means that only the angles that are defined by lines that connect the centers of gravity of two pixels and the vertical direction are allowed. Preferably, m=1 and n>2.

The expression above for $x_m$ and $y_n$ simplifies to the equations above when $\beta_x=\beta_y=0$.

The expression for tan(θ) then becomes:

$$\tan(\theta) = \frac{ap_x}{bp_y}$$

This is equivalent to the expressions above for the rectangular (non-skewed) pixel grid when $$\frac{a}{b} = \frac{2}{q \cdot m}.$$

Thus, the equations above for a skewed grid provide a general solution to the optimization of the lens slant angle and lens pitch.

The general solution for the lens pitch becomes:

$$P_L = \frac{n_1}{n_2} \cdot p_x \cdot (1 + \tan(\beta_x) \cdot \tan(\beta_y))$$

The invention is applicable generally to pixel layouts with at least two rows of at least two sub-pixels, and at least three different colors.

The invention can be applied to all types of display panels, including but not limited to cathode ray tubes, plasma panels, light emitting diode (LED) panels or organic light emitting diode (OLED) display panels.

The invention can be applied to autostereoscopic displays or autostereoscopic displays that can be switched between 2D and 3D view. In particular for the 2D/3D switchable autostereoscopic display the lenticular lenses may in one mode be switchable between at least two modes of operation, the first being a lens mode for providing the autostereoscopic viewing of the display device and the second mode being a pass through mode for the display panel light for providing the 2D viewing of the display device. The lenses may be switchable themselves, or the light provided to the lenses may be manipulated such that the lenses act as pass through or lens. Also switchable graded index lenses may be used with the invention in the switchable autostereoscopic context.

The lenses of the array may have a curved side and opposite flat side. In this case their orientation may be with their curved side to the display panel or the other way around without loss of effect of the invention.

It should be noted that the above-mentioned embodiments illustrate rather than limit the invention, and that those skilled in the art will be capable of designing many alternative embodiments without departing from the scope of the invention as defined by the appended claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
a display panel having an array of pixels, wherein the pixels are arranged in rows and columns and wherein each of the pixels comprises at least four sub-pixels including sub-pixels of at least three different colors;
a lenticular array arranged over the display panel for projecting a plurality of views in different directions towards a user, and comprising lenticular lenses to project outputs of groups of the sub-pixels into the plurality of views projected towards a user in different directions, thereby enabling autostereoscopic imaging, wherein the lenticular lenses have a long axis which is slanted at an angle θ to the general column pixel direction, and have a pitch $P_L$,
wherein each pixel has a width in the general row direction of $p_x$ and a height in the general column direction of $p_y$, and wherein $$\text{a lens slant is} = \tan(\theta) = \frac{ap_x}{bp_y},$$

wherein the rows of pixels are parallel to the display top edge horizontal and the columns of pixels are parallel to the display side edge, and wherein a and b are positive integer numbers, $$P_L = \frac{n_1}{n_2} \cdot p_x,$$

with $n_1$ and $n_2$ being positive integer numbers, wherein $n_1/n_2$ is non integer, and $$\frac{a}{b} = \frac{2}{q \cdot m}$$

wherein q is the number of different color sub pixels per pixel, and m being a positive integer number.

2. A device as claimed in claim 1, wherein $n_2=q$.
3. A device as claimed in claim 2, wherein q=4 such that $$\text{the lens slant} = \tan(\theta) = \frac{1}{2m} \frac{p_x}{p_y},$$

and $$P_L = \frac{n}{4} \cdot p_x$$

with m and n being positive integer numbers.

4. A device as claimed in claim 3, wherein n=4k+1 where k is a positive integer.
5. A device as claimed in claim 4, wherein:
$p_x/p_y$=1 and m=1 and n=5.
6. A device as claimed in claim 4, wherein:
$p_x/p_y$=⅔ and m=1 and n=9.
7. A device as claimed in claim 3, wherein each pixel comprises four columns of sub-pixels and two rows of sub-pixels with different colors in each column, wherein the combined width of two columns is equal to the combined width of the other two columns.
8. A device as claimed in claim 7, wherein the pixel comprises an RGBW pixel, and the pixel column widths are all the same.
9. A device as claimed in claim 3, wherein each pixel comprises an RGBY pixel having four columns of sub-pixels, and $p_x/p_y$=1 and m=3 and n=4k+2 where k is a positive integer.
10. A device as claimed in claim 9, wherein k=2.
11. A device as claimed in claim 10, wherein the red and blue sub-pixels have the same width and the green and yellow sub-pixels have the same width.
12. A device as claimed in claim 11, wherein the yellow and green sub-pixels are narrower than the red and blue sub-pixels.

* * * * *